United States Patent [19]

Ueda

[11] 4,294,896
[45] Oct. 13, 1981

[54] BATTERY WITH FLAME INTERCEPTING FILTER AND GROUNDING LEAD

[75] Inventor: Masahiro Ueda, Toyota, Japan

[73] Assignee: Toyota Jidosha Kogyo Kabushiki Kaisha, Toyota, Japan

[21] Appl. No.: 176,349

[22] Filed: Aug. 8, 1980

[30] Foreign Application Priority Data

Aug. 29, 1979 [JP] Japan .......................... 54-119576[U]

[51] Int. Cl.³ ........................................... H01M 2/12
[52] U.S. Cl. ........................................ 429/86; 429/89
[58] Field of Search .................................... 429/86, 89

[56] References Cited

U.S. PATENT DOCUMENTS 4,091,180 5/1978 Fox et al. ........................... 429/89 X

Primary Examiner—Charles F. LeFevour
Attorney, Agent, or Firm—Stevens, Davis, Miller & Mosher

[57] ABSTRACT

An electrical storage battery, which includes a battery casing formed with a gas venting exhaust passage which communicates the interior of the battery casing to the atmosphere; a flame intercepting filter located at an intermediate portion of the gas venting exhaust passage and extending across it; and a means for grounding part of the vicinity of a part of the passage which is on the atmosphere side of the flame intercepting filter. Thereby, sparking is prevented from occurring from a high voltage electrical source outside the battery to any conducting film of electrolyte formed on the wall of the passage on the inner side of the filter, and thus explosion of hydrogen gas/oxygen mixture within the battery casing is guarded against.

9 Claims, 7 Drawing Figures

BATTERY WITH FLAME INTERCEPTING FILTER AND GROUNDING LEAD

BACKGROUND OF THE INVENTION

The present invention relates to the field of electrical storage batteries, and, in particular, relates to a lead-acid electrical storage battery which is provided with an anti explosion protective device.

Lead-acid batteries, whose electrodes are made of lead, and which are filled with an electrolytic fluid comprising sulphuric acid, are well known, and are often used in automotive applications or the like. Such batteries, when they are being charged, evolve hydrogen gas within their battery casings in fairly large quantities. Therefore, such lead-acid electrical storage batteries usually are provided with a gas venting exhaust passage, which connects the interior of the battery casing to the atmosphere for venting the gases generated within the battery casing to the atmosphere.

Thereby a danger has arisen, in that if a naked flame should be exposed near a lead-acid electrical storage battery when it is being charged, or if an electrical spark should occur near to the battery, due, for example, to a high voltage electrical potential generated by a high voltage device such as a coil, or alternatively due to static electricity generated by friction or the like, it may well occur that the hydrogen gas that is being emitted from the gas venting exhaust passage of the storage battery should become ignited, and the flame front traveling through this hydrogen gas may well enter inside the battery casing, moving back up the exhaust outlet passage formed in the battery casing, and may ignite a fairly substantial quantity of explosive hydrogen gas-oxygen mixture filling the battery casing, thus causing a disastrous explosion. Such an explosion, apart from destroying the storage battery, will scatter the corrosive sulphuric acid contained in the electrolytic fluid around the vicinity of the battery.

Therefore, in consideration of the above described difficulty with conventional lead-acid storage batteries, there has already been proposed, and practiced, an improvement to a lead-acid storage battery, in which, across the gas venting exhaust passage of the battery casing, there is provided a flame intercepting filter, made of a sponge-like coarse material. This flame intercepting filter in the gas venting exhaust passage acts as an effective bar to the travel of a flame front through the hydrogen gas which is being evolved and vented through the passage, and thus prevents this flame front from entering into the interior of the battery casing. Thereby, it is effectively prevented that a flame front starting in the evolved hydrogen gas which is on the atmosphere side of the flame intercepting filter should travel back to the interior of the battery casing and cause an explosion therein.

This solution to the above described problem has been effective and has been widely practiced. However it does not completely solve the explosion problem of lead-acid electrical storage batteries, because it sometimes happens that, during the charging process of such a lead-acid electrical storage battery, a mist composed of small droplets of electrolytic fluid suspended in the hydrogen gas which is being passed through the gas emitting discharge passage is formed, especially if the charge rate of the battery is high, and droplets of electrolytic fluid deposited from this mist may form an electrically conducting layer on the wall of the gas venting exhaust passage, on both sides of the flame intercepting filter. This conducting layer will retain its conductivity, due to the affinity of sulphuric acid for atmospheric water vapor, i.e., its hygroscopicity. Thus, if a source of high voltage electricity is brought close to the exterior of the electrical storage battery, a possibility arises of sparking electric discharge between this high voltage source and the abovementioned electrical conducting electrolytic fluid layer.

If this sparking electrical discharge occurs on the atmospheric side of the flame intercepting filter in the gas venting exhaust passage, then no problem will occur, because any flame front, as explained above, passing through the hydrogen gas which is being evolved, outside the battery, will be prevented from entering within the battery casing, by the flame intercepting filter. Thus, any explosive mixture of hydrogen gas and oxygen within the battery casing will not be ignited, and no explosion can occur.

On the other hand, however, if the conducting layer of electrolytic fluid deposited on the wall of the gas venting exhaust passage is discontinuous at a portion within the battery casing interior, i.e., to the battery casing interior side of the flame intercepting filter within the gas venting exhaust passage, an electric spark may occur at the discontinuous gap portion from a high voltage electrical source, and, accordingly, an explosive mixture of hydrogen gas and oxygen filling the battery casing may be ignited. Thereby, a disastrous explosion may occur, even though the abovementioned flame intercepting filter is located in position within the gas venting exhaust passage.

SUMMARY OF THE INVENTION

Therefore, an object of the present invention is to provide a lead-acid storage battery incorporating a gas venting exhaust passage with a flame intercepting filter therein as above described, which is improved in that electrical sparking on the battery casing interior side of the flame intercepting filter in the gas venting exhaust passage is effectively prevented.

A further object of the present invention is to provide a lead acid storage battery which is safer during use, especially during the charging process, than prior art electrical storage batteries.

A further object of the present invention is to provide a lead-acid storage battery in which there is provided a grounding member for ensuring that a stray electrical spark cannot cause the battery to explode.

According to the present invention, these, and other, objects are accomplished by an electrical storage battery, comprising; a battery casing formed with a gas venting exhaust passage which communicates the interior of the battery casing to the exterior thereof; a flame intercepting filter located at an intermediate portion of the gas venting exhaust passsage and extending thereacross so as to define a passage portion on the exterior side of the flame intercepting filter; and a means for substantially grounding a part of the vicinity of a part of said exterior side passage portion.

According to such a structure, even if a source of high electrical voltage is brought near to the gas venting exhaust passage, any electric discharge which occurs will occur between the high electrical voltage source and the grounding element, and, even if a conducting layer of electrolytic fluid is deposited on the walls of the gas venting exhaust passage, no electrical sparking or discharge will occur between the high voltage electrical source and this conducting layer of electrolytic fluid. Therefore, any sparking due to discharge from the high voltage electrical source will occur only on the atmospheric side of the flame intercepting filter within the gas venting exhaust passage, and, accordingly, it is effectively prevented that any explosive mixture of hydrogen gas and oxygen filling the battery casing interior should become ignited. This, therefore, greatly improves the reliability and safety of such a lead-acid electrical storage battery.

BRIEF DESCRIPTION OF THE DRAWINGS

The present invention will become more fully understood from the following description of some preferred embodiments thereof, which is to be taken in conjunction with the accompanying drawings. It should be clearly understood, however, that the description of the embodiments, and the drawings, are all of them provided purely for the purposes of illustration and exemplification only, and are in no way to be taken as limitative of the scope of the present invention. In the drawings.

DESCRIPTION OF THE PREFERRED EMBODIMENTS

The present invention will now be described with reference to some particular preferred embodiments thereof, and with reference to the attached drawings.

Figure 1:
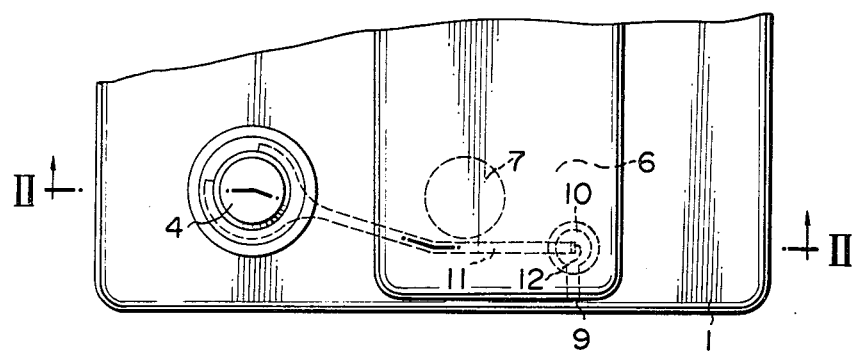
FIG. 1 is a plan view of a lead-acid storage battery which is a first preferred embodiment of the present invention, showing only parts thereof which are essential for an understanding of the present invention.
Figure 2:
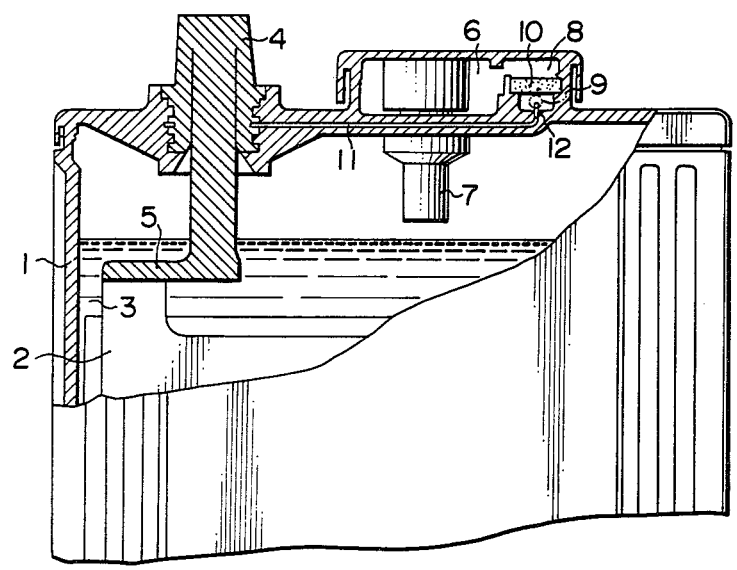
FIG. 2 is a cross sectional view through the battery according to the first preferred embodiment of the present invention shown in FIG. 1, taken along the line II—II in FIG. 1.

FIGS. 1 and 2 show a first preferred embodiment of the lead-acid storage battery according to the present invention. In these drawings, there are generally shown only the parts of the lead-acids storage battery which are relevant to an understanding of the present invention.

This lead-acid storage battery comprises a battery casing 1, which is made of plastic, or some other electrically insulating material. Inside the battery casing 1, there are provided a plurality of lead electrode plates 2 arranged, in a conventional fashion, as sandwiched over one another; and, further, the interior of the battery casing 1 is filled with a quantity of electrolytic fluid 3, which includes a substantial proportion of sulfuric acid.

These lead electrode plates 2 are connected to a battery terminal post 4, the extremity of which protrudes from the outside of the battery casing 1, and which extends downwards inside the battery casing 1, by a plurality of conducting strap members 5.

On the upper side of the battery casing 1 there is formed a gas venting exhaust plenum 6, which is communicated, on the one hand, to the upper portion of the battery casing 1 through a funnel shaped member 7, and, on the other hand, is communicated to the atmosphere via a first gas venting exhaust passage portion 8 and a second gas venting exhaust passage portion 9, in that order, which are connected together, and are communicated with one another via a porous flame intercepting filter 10. Thus the inner end of the first gas venting exhaust passage portion 8 connects to the gas venting exhaust plenum 6, the outer end of the first gas venting exhaust passage portion 8 is proximate to one side of the porous flame intercepting filter 10, the inner end of the second gas venting exhaust passage portion 9 is proximate to the other side of the porous flame intercepting filter 10, and the other end of the second gas venting exhaust passage portion 9 opens to the atmosphere outside the battery casing 1.

According to the present invention, in the upper wall portion of the battery casing 1 there is embedded an electrically conducting element 11, the one end of which provides a grounding terminal end portion 12 within the second gas venting exhaust passage portion 9. Thus, this end portion 12 is provided within the gas venting exhaust passage comprising the first gas venting exhaust passage portion 8 and the second gas venting exhaust passage portion 9, on the atmospheric side of the porous flame intercepting filter 10.

The other end of the electrically conducting element 11 is connected to the battery terminal post 4, as may be seen in FIG. 2. Because the grounding terminal end portion 12 is exposed to vapor and mist comprising sulfuric acid, it is preferable to form the electrically conducting element 11, or at least the grounding terminal end portion 12 thereof, out of lead or some other sulphuric acid resistant material, or alternatively to coat it therewith.

Thus it is seen that, according to the present invention, if a high voltage electrical source is brought near to the atmospheric end of the second gas venting exhaust passage portion 9, so that a risk exists of sparking by electrical discharge from this high voltage electrical source to a conducting layer of sulphuric acid droplets which may be formed on the walls of the first gas venting exhaust passage portion 8 and of the second gas venting exhaust passage portion 9, such sparking is effectively prevented by the grounding terminal end portion 12, which absorbs any such electrical discharge, and grounds it to the battery terminal post 4, which effectively provides grounding to the vehicle in which the storage battery is fitted, even if in fact the battery terminal post 4 is not the ground terminal of the battery.

Accordingly, any sparking within the first gas venting exhaust passage portion 8, i.e. on the side of the porous flame intercepting filter 10 towards the interior of the battery casing 1, is effectively prevented. Thereby, ignition of any explosive mixture of hydrogen gas and oxygen within the battery casing 1 is hindered, and accordingly, a safer and more reliable lead-acid storage battery is made available.

Figure 3:
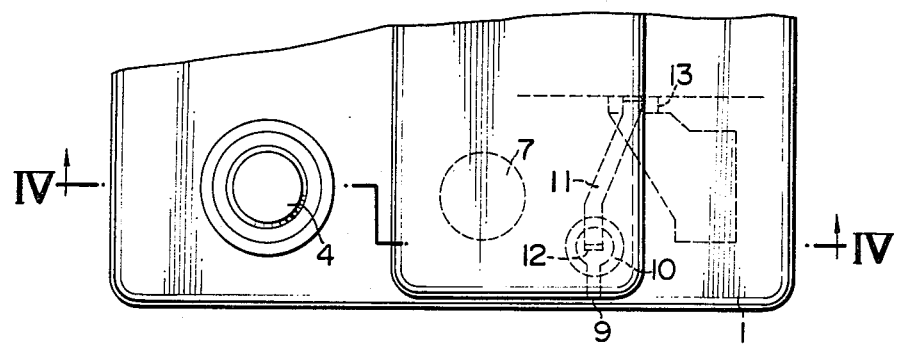
FIG. 3 is a plan view, similar to FIG. 1, showing essential portions of a lead-acid storage battery which is a second preferred embodiment of the present invention.
Figure 4:
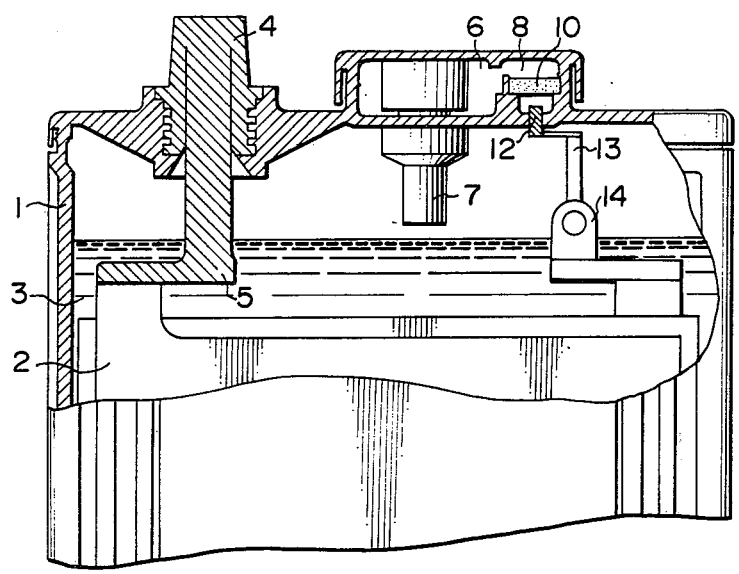
FIG. 4 is a cross sectional view, similar to FIG. 2, taken along the line IV—IV in FIG. 3, and showing the essential parts of this second preferred embodiment of the present invention.

FIGS. 3 and 4 show a second embodiment of the lead-acid storage battery according to the present invention.

In this embodiment, the grounding terminal end portion 12 is connected, inside the interior of the battery casing 1, to an electrically conducting member 13, the other end of which is connected to an internal battery plate terminal 14 which is connected to one of the lead electrode plates 2 mounted within the battery casing 1. The other details of the construction of this second embodiment are the same as those of the first embodiment.

Since the voltage of a high voltage electrical source such as may cause dangerous electrical sparking discharge when approached to the outside of the second gas venting exhaust passage portion 9 is very much higher than the actual voltage produced by the storage battery itself, this connection of the electrically conducting member 13 to one of the internal plates of the storage battery is equally for providing grounding for the grounding terminal end portion 12, irrespective of whether it is in fact connected to an anode plate or a cathode plate of the storage battery. This embodiment has the advantage that, in some configurations, the length of the electrically conducting member 13 may be shorter than the length of the electrically conducting element 11 in the first preferred embodiment. However, it has the disadvantage that the internal battery plate terminal 14 needs to be provided.

Thus, according to this embodiment also, if a high voltage electrical source is brought near to the outlet of the second gas venting exhaust passage portion 9, any sparking that occurs from this high voltage electrical source will take place from it to the grounding terminal end portion 12, and will not pass, via any film of droplets containing sulfuric acid deposited on the inside of the second gas venting exhaust passage portion 9, to a similar film deposited on the inside of the first gas venting exhaust passage portion 8, and thus cannot produce to or from this second film a sparking electrical discharge in the first gas venting exhaust passage portion 8, the interior of the gas venting exhaust plenum 6, or the battery casing 1, and produce a disastrous explosion. Thus, according to this embodiment also, a safe and reliable storage battery is provided.

Figure 5:
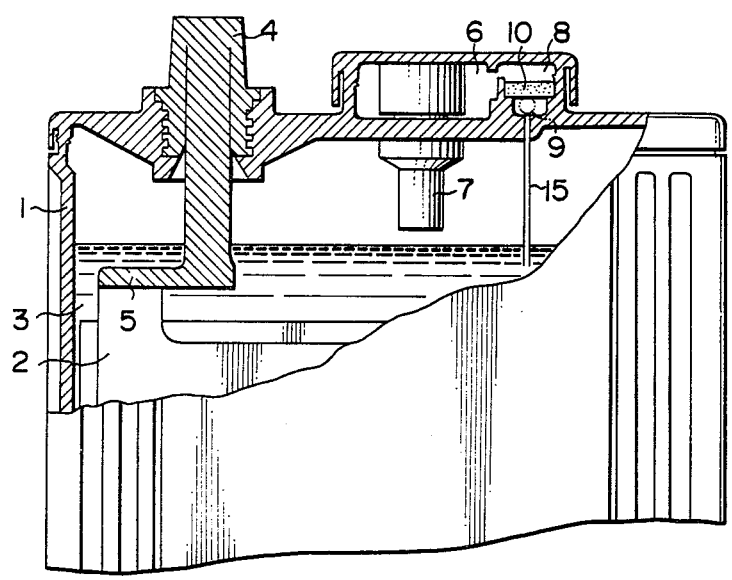
FIG. 5 is a cross sectional view, similar to FIGS. 2 and 4, taken through a lead-acid storage battery which is a third preferred embodiment of the present invention.

FIG. 5 shows the essential parts of a third embodiment of the present invention, is a cross sectional view similar to FIGS. 2 and 4.

In this embodiment also, parts which correspond to similar parts in the first and second embodiments are designated by the same reference numerals as in the figures showing those embodiments. In this third embodiment, the function of the grounding terminal end portion 12 is provided by the upper end of an electrolytic fluid capillary tube 15. This upper end of the electrolytic fluid capillary tube 15 opens into the second gas venting exhaust passage portion 9, and the lower end of the electrolytic fluid capillary tube 15 opens below the surface of the electrolytic fluid 3 which fills the battery casing 1.

During use of the storage battery, this electrolytic fluid capillary tube 15 is always filled with electrolytic fluid from the interior of the battery casing 1, by capillary action. Thus, the upper end of the electrolytic fluid capillary tube 15, with the electrolytic fluid filled therein by capillary action, provides a grounding terminal within the second gas venting exhaust passage portion 9 for absorbing discharge of high voltage electricity from any high voltage electrical source, such as a statically charged body or a coil of an automobile or the like, which may be brought near the outside of the battery casing 1.

As an improvement of this embodiment, it is possible to fill the interior of the electrolytic fluid capillary tube 15 with a porous material which further promotes the capillary action of the tube so as to fill its inside with the electrolytic fluid within the battery casing, thus positively providing stable and continuous electrical conduction within the electrolytic fluid capillary tube 15.

This third embodiment has the advantage of simplicity of construction and of cheapness in materials required. Further, it is lighter.

Figure 6:
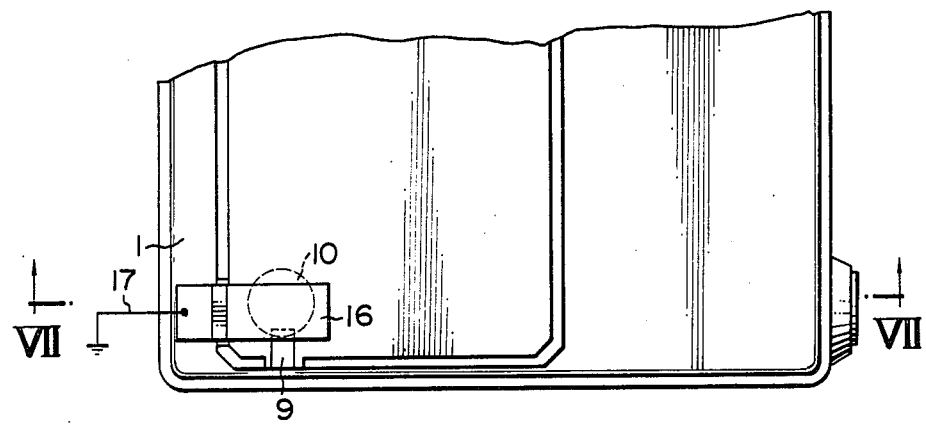
FIG. 6 is a plan view, similar to FIGS. 1 and 3, showing essential parts of a storage battery which is a fourth preferred embodiment of the present invention.
Figure 7:
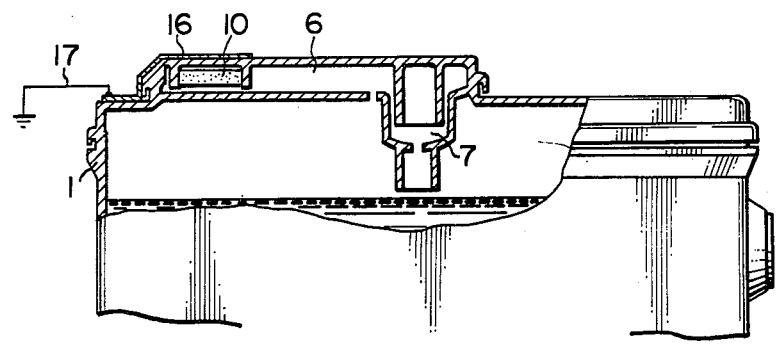
FIG. 7 is a cross sectional view, similar to FIGS. 2, 4, and 5, taken along the line VII—VII in FIG. 6, and showing essential parts of this fourth preferred embodiment of the present invention.

A fourth preferred embodiment of the lead-acid storage battery according to the present invention is shown in FIGS. 6 and 7. The construction of this fourth embodiment is a little different from the construction of the first, second, and third embodiments. In FIGS. 6 and 7, as before, like parts to parts shown for the first, second, and third embodiments are designated by the same reference numerals as were used for their corresponding parts in the figures showing those embodiments.

In this fourth embodiments, an electrical grounding plate 16 is provided, and this electrical grounding plate 16 is grounded, not to either of the terminals of the battery, or inside the battery to an electrode plate thereof, but separately via a grounding lead wire 17 to the earth of the vehicle to which the battery is fitted. Further, this electrical grounding plate 16 does not project within the second gas venting exhaust passage portion 9, i.e. on the atmospheric side of the porous flame intercepting filter 10, within the gas venting exhaust passage of the battery. Instead, this electrical grounding plate 16 is provided on the outside of the battery, proximate to the atmosphere end of the second gas venting exhaust passage portion 9.

In this embodiment, also, if a source of high voltage electricity, such as an object, which has been electrically charged by static, or a high voltage device of the vehicle to which the battery is fitted is approached to the outside of the battery casing 1, near the atmosphere end of the second gas venting exhaust passage portion 9, then any sparking or electrical discharge which may occur from this source of high voltage electricity will occur between it and the electrical grounding plate 16, and will not penetrate within the second gas venting exhaust passage portion 9 to cause sparking on the battery casing interior side of the porous flame intercepting filter 10, via any electrically conducting surface formed of droplets of sulfuric acid condensed on the sides of the second gas venting exhaust passage portion 9, of the first gas venting exhaust passage portion 8, or of the gas venting exhaust plenum 6.

Thus, according to this embodiment, a positively explosion proofed lead-acid storage battery is provided, in which the provision of the ground lead wire 17 ensures that sparking from a high voltage electrical source near the battery cannot cause ignition of any explosive mixture of hydrogen gas and oxygen within the battery casing.

Therefore, it is seen that, according to any of the above described preferred embodiments of the present invention, there is provided a safe ground near or in the outer part of the gas venting exhaust passage of the electrical storage battery, and, according to the present invention, a lead-acid storage battery is provided in which there is no substantial risk of explosion due to approach of a high voltage electrical source thereto.

Although the present invention has been shown and described in terms of several preferred embodiments thereof, and in language more or less specific with regard to structural features thereof, and with reference to the illustrative drawings, it should be understood that in any particular embodiment of the present invention various changes, modifications, and omissions of the form and the detail thereof could be made by a person skilled in the art, without departing from the essential scope of the invention. Therefore, it is expressly desired that the scope of the present invention should be uniquely delimited by the legitimate and valid scope of the appended claims, which follow, and not by any of the perhaps purely fortuitous details of the shown embodiments, or of the drawings.

I claim:

1. An electrical storage battery, comprising;
   a battery casing formed with a gas venting exhaust passage which communicates the interior of the battery casing to the exterior thereof;
   a flame intercepting filter located at an intermediate portion of the gas venting exhaust passage and extending thereacross so as to define a passage portion on the exterior side of the flame intercepting filter;
   and a means for substantially electrically grounding in the vicinity of a part of said exterior side passage portion.

2. An electrical storage battery according to claim 1, wherein the grounding means substantially grounds a part of the interior of said exterior side passage portion.

3. An electrical storage battery according to claim 2, further comprising an electrode plate, wherein the grounding means comprises an electrically conducting member, one end of which is exposed within said exterior side passage portion, and the other end of which is electrically connected to said electrode plate.

4. An electrical storage battery according to claim 3, further comprising a terminal post electrically connected to said electrode plate, wherein the electrically conducting member is substantially totally embedded within the battery casing, and is connected to said terminal post.

5. An electrical storage battery according to claim 3, wherein the electrically conducting member extends within the interior of the battery casing, and is therein connected to said electrode plate.

6. An electrical storage battery according to claim 2, wherein the grounding means comprises a capillary tube, one end of which opens within interior of the battery casing.

7. An electrical storage battery according to claim 6, wherein the capillary tube is filled with a porous material.

8. An electrical storage battery according to claim 1, wherein the grounding means substantially grounds a part of the outer surface of the battery casing proximate to the battery casing exterior end of the gas venting exhaust passage.

9. An electrical storage battery according to claim 8, wherein the grounding means comprises a grounding plate mounted on the outer surface of the battery casing proximate to the battery casing exterior end of the gas venting exhaust passage, and a grounding lead wire leading from this grounding plate for connection to ground.

* * * * *